Sept. 25, 1956 B. VONNEGUT 2,764,023
APPARATUS FOR MEASURING TRUE TEMPERATURE
OF MOVING COMPRESSIBLE FLUIDS
Filed Sept. 2, 1949 2 Sheets-Sheet 1
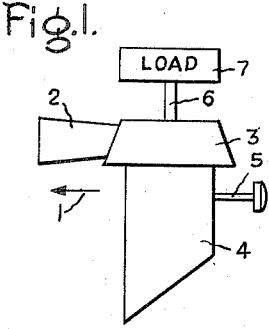
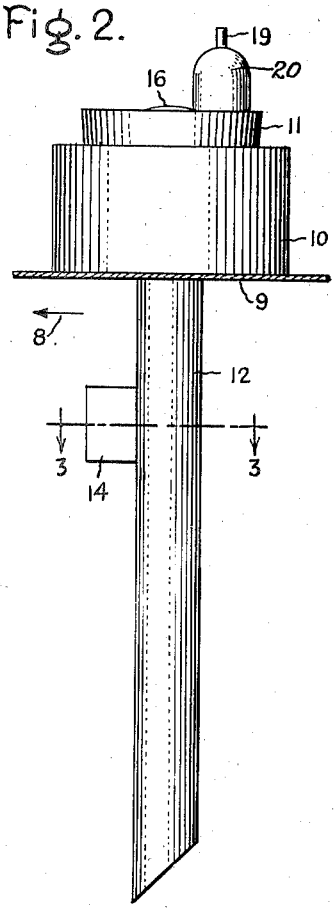
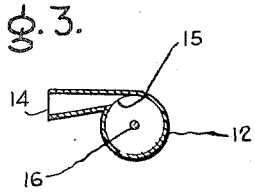
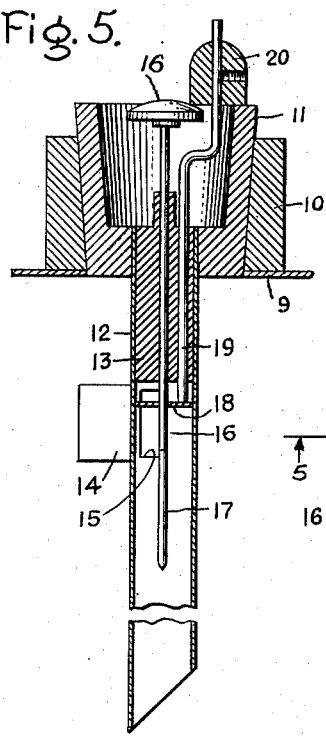
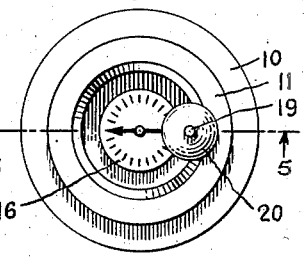
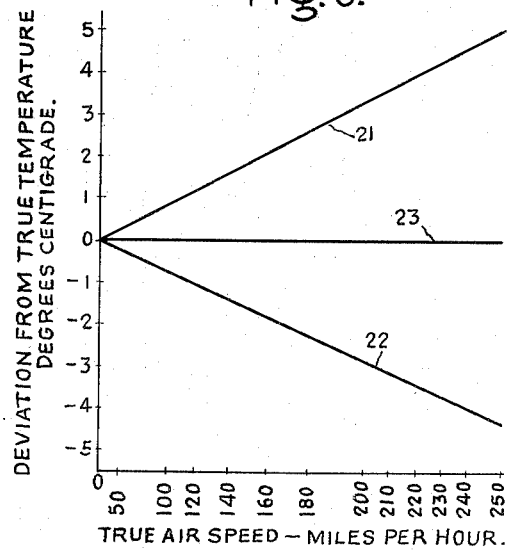
Inventor:
Bernard Vonnegut,
by Paul A. Frank
His Attorney.

Sept. 25, 1956
B. VONNEGUT
2,764,023
APPARATUS FOR MEASURING TRUE TEMPERATURE
OF MOVING COMPRESSIBLE FLUIDS
Filed Sept. 2, 1949
2 Sheets-Sheet 2
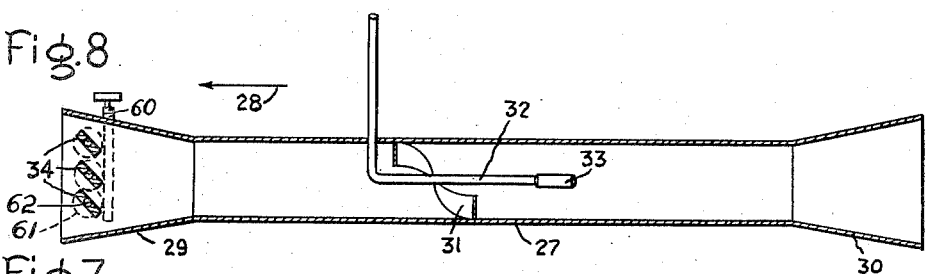
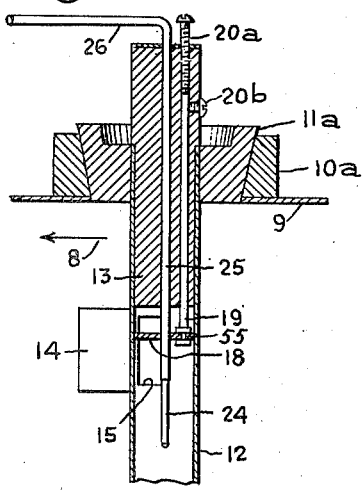
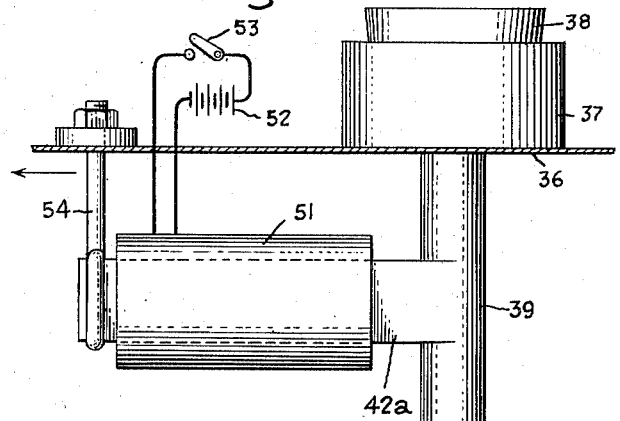
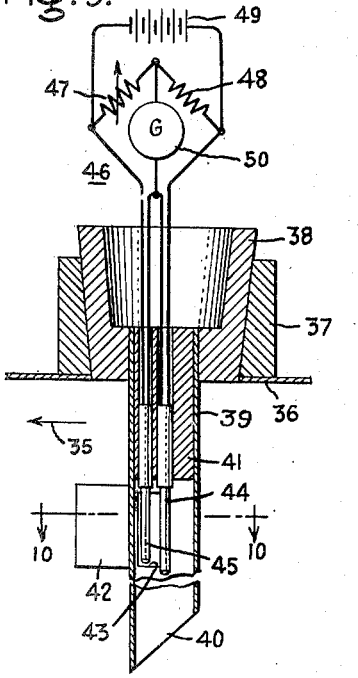
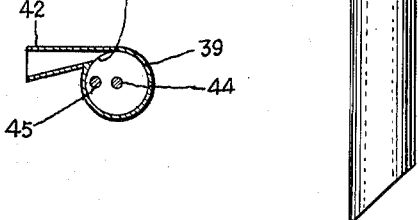
Inventor:
Bernard Vonnegut,
by Paul A. Frank
His Attorney.

United States Patent Office 2,764,023
Patented Sept. 25, 1956

2,764,023

APPARATUS FOR MEASURING TRUE TEMPERATURE OF MOVING COMPRESSIBLE FLUIDS

Bernard Vonnegut, Alplaus, N. Y., assignor to General Electric Company, a corporation of New York Application September 2, 1949, Serial No. 113,874

1 Claim. (Cl. 73—349)

This invention relates to improved apparatus for measuring the true temperature of moving compressible fluids, and particularly to improved instruments for use aboard moving aircraft to measure true air temperature. Claims directed to embodiments of my invention involving the measurement of the true speed of air or other compressible fluid are presented in my divisional application, Serial No. 546,373, filed November 14, 1955, entitled "Apparatus and Method for Measuring True Speed of Moving Compressible Fluids" and assigned to the assignee of this application.

In making weather observations, the measurement of true air temperature from moving aircraft with ordinary thermometers presents difficulties. The air, which is in motion relative to the thermometer, compresses adiabatically in front of the thermometer, and thereby produces a temperature rise which affects the measurement. Other factors, such as friction between air and thermometer, may also contribute to the error in measured temperature. The measured temperature may be in the order of 5° centigrade higher than true air temperature at an air speed of 250 miles per hour.

To determine true temperature from measurements made with conventional instruments, the error in measured temperature must be computed, which requires that true air speed be known. This presents further difficulties, since the air speed indicated by conventional air speed instruments must be corrected for several other variables, which include altitude and even temperature. It can be appreciated that the determination of temperature in this manner is somewhat uncertain as to accuracy, and that the work of making the computation can be considerable, especially when a large number of temperature readings are taken.

An object of this invention is to provide improved means to measure true air temperature directly, and thus eliminate the computations heretofore necessary.

In making measurements with conventional thermometers, an additional complication arises whenever the airplane passes into a cloud. Moisture may collect on the thermometer, then immediately begin to evaporate. Such evaporation is aided by the temperature rise of air compressed in front of the thermometer. This creates a complex situation, since the evaporating moisture cools the thermometer, in which the computation of true temperature is uncertain and doubtful.

Another object of this invention is to provide improved instruments for measuring true air temperature from aircraft traveling through clouds.

The foregoing difficulties are chiefly caused by the temperature rise of the air due to the kinetic energy of the air's motion relative to the instrument. If the air around the instrument is decelerated to a low velocity relative to the instrument without a removal of energy, as by an obstruction which impedes the air flow, the kinetic energy causes a pressure increase and a consequent adiabatic temperature rise of compression. If the air is not decelerated as it flows over the instrument, frictional heating takes place which is of the same order of magnitude as the heating which would be caused by compression.

A principle of this invention is to decelerate the air by use of a nearly adiabatic expansion, thereby removing from it an amount of energy substantially equal to its kinetic energy. This provides a mass of air which moves with the instrument and which has the original temperature and pressure of the atmosphere. Because this air mass has little velocity relative to the instrument, its true temperature can be measured easily.

Another object of this invention is to provide improved means for extracting energy from the moving air, and then directly measuring its true temperature.

The principles of this invention are also useful in the measurement of true air speed. Since the temperatures measured with a conventional thermometer increase as a function of true air speed, the difference between temperature so measured and the true air temperature, measured as herein explained, can be used as a direct indication of true air speed.

It will be appreciated that the principles of this invention are applicable to the measurement of true temperature and speed of other compressible fluids, as well as air, which are in motion relative to the instrument.

Other objects and advantages will appear as the description proceeds. The features of this invention which are believed to be novel and patentable are pointed out in the claim which forms a part of this specification.

For a better understanding of the invention, reference is made in the following description to the accompanying drawings in which Fig. 1 is a schematic view of apparatus for measuring true air temperature; Fig. 2 is an elevation of preferred apparatus for measuring true air temperature; Fig. 3 is a section along line 3—3 Fig. 2; Fig. 4 is a top view of the instrument shown in Fig. 2; Fig. 5 is a section along line 5—5, Fig. 4; Fig. 6 is a graph of temperatures versus true air speed, hereinafter more fully described; Fig. 7 is a vertical section showing a modification of the apparatus shown in Figs. 2 to 5; Fig. 8 is a vertical section of another instrument for measuring true air temperature; Fig. 9 is a vertical section of apparatus for measuring air speed; Fig. 10 is a section along line 10—10, Fig. 9; and Fig. 11 is an elevation showing a modification of the apparatus shown in Figs. 9 and 10.

Refer now to Fig. 1, which shows one form of apparatus for measuring true air temperature. Arrow 1 points in the direction of motion of the instrument relative to the air. If the instrument is mounted on an airplane, arrow 1 points toward the front of the airplane. Air enters air scoop 2 and is directed into turbine 3, where the air expands substantially adiabatically, and thereby is decelerated without being heated. The expanded air then passes into exhaust pipe 4, and is discharged through the open lower end of this pipe. The lower end of pipe 4 preferably is cut on an angle as shown, so that its opening faces substantially downstream with respect to the movement of air past the apparatus. This creates a suction which draws air from the exhaust pipe and aids in maintaining a sufficient flow of air through the turbine. A thermometric device 5, such as a dial thermometer, is inserted in the exhaust pipe to measure the temperature of the expanded air. The turbine shaft 6 is connected to a load 7, which may be any suitable device for absorbing the required amount of energy, as hereinafter explained.

The temperature measured by a conventional thermometer in air which is in motion relative to the thermometer is greater than the true air temperature by an amount proportional to the equivalent kinetic energy of the air due to its motion relative to the instrument. If an amount of energy equivalent to this kinetic energy is first extracted from the air, and then the air temperature is measured, the thermometer will indicate the original true air temperature. This may be substantially accomplished if load 7 has a torque of proper magnitude which is proportional to the speed of shaft 6, so that the amount of energy absorbed by load 7, and hence the amount of energy extracted from the air by turbine 3, is substantially proportional to the square of air speed. Load 7 may be any mechanical or electromechanical device having this torque characteristic, such as an appropriately designed series-wound electric generator.

A simple and preferred instrument for measuring true air temperature is shown in Figs. 2 through 5. Referring now to these figures, arrow 8 points in the direction of motion of the instrument relative to the air; for example, toward the front of an airplane on which the instrument may be mounted. The skin of the airplane is illustrated at 9. An annular support 10 is attached to the inner side of skin 9. Instrument base 11 fits snugly in the hole through the center of support 10, and is supported thereby.

Attached to base 11 and extending outward from the airplane is a cylindrical tube 12. The inner end of this tube is closed by a plug 13, while the outer end is open. Flow-directing means 14 consists of a small air scoop, facing toward the front of the airplane and defining a passageway which opens tangentially into the closed end of tube 12 through an opening 15 in the tube wall. Air in motion relative to the instrument is guided by flow directing means 14 into tube 12, passes through the tube and out the open lower end. The lower end of tube 12 preferably is cut at an angle as shown, so that its opening faces substantially downstream with respect to the air moving past the instrument. This causes air to be sucked out of the lower end of tube 12 and aids in maintaining a sufficient flow of air through the tube.

Since air enters tube 12 tangentially, a vortex is established within the tube. Because of the high angular velocity of the air in its vortical flow through tube 12, the pressure in the central portion of the vortex is substantially reduced by centrifugal force, so that air within this portion expands substantially adiabatically and transfers energy to air in outer portions of the vortex, which is compressed. This energy transfer tends to cool the air at the center of the vortex.

A thermometric device, which may be a dial thermometer 16 as shown, is positioned substantially along the axis of tube 12 with its temperature sensitive portion 17 preferably located just below opening 15 and in the central portion of the vortical flow of air through tube 12. Thus thermometer 16 measures temperature of portions of air from which energy is extracted by adiabatic expansion within the vortex.

The amount of cooling in the central portion of the vortex can be regulated by controlling the amount of air admitted to tube 12. For this purpose there is provided calibrating means comprising a valve 18, which may be a circular metal disc, movable up or down within tube 12 to vary the effective size of opening 15. The portion of opening 15 which is above valve 18 is in effect closed off, since the valve prevents the flow of air from this portion to the open end of tube 12.

To adjust the position of valve 18, the valve is attached to a rod 19 which extends upward through plug 13, as shown, to a knob 20 or other suitable means for adjusting its position.

Referring now to Fig. 6, deviations from true temperature in degrees centigrade are shown by the ordinate values of the several curves, and the true air speed is shown by the abscissa values. Curve 21 represents the temperature deviation which may be encountered when making measurements with a conventional thermometer projecting from the side of the plane. It may be noted that the temperature deviation increases as the square of true air speed, and reaches a value of 5° centigrade at a speed of 250 miles per hour.

Curve 22 represents the deviations from true temperature in measurements made with the instrument shown in Figs. 2 to 5 with valve 18 in its uppermost position, so that opening 15 is fully open and the maximum amount of air is admitted into tube 12. It may be noted from curve 22 that the temperature so measured decreases by amounts proportional to the square of true air speed, which shows that the amount of energy extracted from the air in the center portion of the vortex within tube 12, with valve 18 fully open, is greater than the equivalent kinetic energy of the same air due to its original motion relative to the instrument.

By adjusting the position of valve 18, curves lying between 21 and 22 can be obtained; and a particular adjustment can be found which will give data represented by curve 23, where there is substantially no change in the indicated temperature with variations in air speed. When this position of valve 18 is found, the instrument is properly calibrated. With the instrument so calibrated, I have found that there is no tendency of the temperature readings to vary either with speed or with altitude, at least within the operating range of an airplane with which tests have been made.

Another advantage of this instrument is a relative freedom from errors caused by moisture in the atmosphere, as when the plane flies through a cloud. Because of the high angular velocity of the air flowing through tube 12, any water droplets in the air are forced outward away from thermometer 16 by centrifugal force, so that there is little tendency for moisture to collect on the thermometer. Even if moisture does collect there, the temperature at the thermometer is the same as the true temperature of the outside air, and, therefore, the air adjacent to the thermometer is at 100 per cent humidity, when the plane is flying through a cloud, and there is no tendency of the water to evaporate and thereby cause errors in the measured temperature. This instrument provides the most reliable means available for measuring true air temperature from an airplane flying through a cloud.

Icing difficulties are also minimized with this instrument, since water does not tend to collect upon the thermometer. Relatively little ice is deposited on the instrument, and any ice which does form collects upon tube 12 whereit does relatively little harm. Even at tube 12, ice formation is minimized, since the air adjacent the inner side of this tube is warmer than the outside air. For use under extreme icing conditions, tube 12 may be heated with an electrical heating element without substantially affecting the temperature indication, or the tube may be coated with substances which are known to inhibit or prevent ice formation.

Refer now to Fig. 7, which is a vertical section showing a modification of the apparatus having a mercury thermometer of a type commonly employed in making weather observations. Except as herein pointed out, Fig. 7 is substantially the same as Fig. 4; and the various parts, which bear the same reference numerals as the corresponding parts in Fig. 4, operate in the same manner.

Instead of a knob to adjust the position of valve 18, rod 19 is pivotally secured by bearing 55 to valve 18 and a screw 20a is attached to the upper end of rod 19. By turning the screw, valve 18 is moved up or down. A locking screw 20b is provided to hold rod 19, and hence valve 18, securely in position when the instrument has been calibrated. Parts 10a and 11a are shown somewhat shallower than the corresponding parts in Fig. 4.

The thermometric device is a mercury-type thermometer having its bulb 24 positioned just below opening 15 and at the axis of tube 12, so that the thermometer responds to the temperature of air in the center portion of its vortical flow through tube 12. The stem 25 of the thermometer extends upward through plug 13. The stem may be bent, as shown, so that its upper end, at which temperature readings are made, extends at right angles to the axis of the instrument, to facilitate making the temperature readings.

It will be appreciated that the invention is not limited to any particular thermometric device, and that other temperature measuring devices, such as thermometric apparatus comprising thermocouples or thermistors, may also be used.

Variations in the means for forming the vortex of the moving air will occur to those skilled in the art. One such variation is shown in Fig. 8. Referring now to this figure, a cylindrical tube 27 is positioned with its axis extending in the direction of its motion relative to the air, such direction being indicated by arrow 28. Both ends of tube 27 are open, so that air flows into the tube at its lefthand end and out at its righthand end. Either or both ends of the tube may be provided with a flare, shown at 29 and 30, to increase the flow of air through the tube.

Vortical flow of air through the tube is established by one or more flow-directing guide vanes 31 attached to the inner surface of tube 27. These vanes import a spiral motion to air flowing through the tube, thus setting up a vortex downstream from the vane. A thermometric device, such as a mercury thermometer 32, is positioned with its temperature-sensitive portion or bulb 33 substantially at the axis of tube 27 and a short distance downstream from vane 31, so that the thermometer measures the temperature of air in the center portion of its vortical flow. A valve comprising shutter 34 may be provided at the front or lefthand end of tube 27, for adjusting the amount of air flowing through the tube to calibrate the instrument. Shutter 34 may be adjusted by a control worm gear 60 which meshes with circular gears 61 attached to pivots 32.

Since the temperature indicated by a conventional thermometer placed in a stream of moving air increases as a function of true air speed, such a thermometer in combination with one of the true air temperature measuring devices hereinbefore described, makes a very attractive form of air speed indicator. In addition to the advantages of simplicity and reliability, such an air speed indicator has the desirable feature that its calibration is not affected by changes in air temperature or density. Therefore, the instrument directly indicates true air speed, and no corrections are necessary for changes in the weather or the altitude of the airplane, at least within the operating range of the airplane with which tests have thus far been conducted.

Refer now to Figs. 9 and 10, which show a preferred form of air speed indicator embodying principles of this invention, and in which both thermometric devices are incorporated in a single instrument. Arrow 35 points in the direction in which the airplane is traveling; in other words, toward the front of the airplane. The skin of the airplane is represented at 36. Attached to the inside of skin 36 is an annular supporting member 37.

The instrument base 38 fits snugly inside the opening of supporting number 37. Attached to base 38, and extending outside the airplane perpendicular to its direction of travel, is a cylindrical tube 31. The lower end 40 of this tube is open, and is cut at an angle so that the opening faces substantially downstream. The upper end of tube 39 is closed by a plug 41. Flow-directing means, comprising air scoop 42, defines a passageway which extends tangentially into the closed end of tube 39 through an opening 43. The flow-directing means admits the moving air tangentially into tube 39, so that the air flows vortically through the tube and out the open end 40.

Positioned substantially at the axis of tube 39, and within the center portion of the vortex, is a first thermometric device, which may be a thermistor 44. A second thermometric device, which may be a thermistor 45, is positioned within tube 39 away from the axis and within the outer portion of the vortex. Because of the transfer of energy away from the center of the vortex, as hereinbefore explained, the temperature at thermistor 44 is lower than the temperature at thermistor 45 by an amount which is substantially proportional to the square of true air speed.

Thermistors 44 and 45 are connected in an electrical circuit which responds to differences between the respective changes in thermistor resistance, and therefore to temperature differences at the two thermistors. For example, thermistors 44 and 45 may be connected in adjacent arms of a Wheatstone bridge circuit 46, which comprises resistors 47 and 48 in the other two arms, a battery 49, or other suitable source of electricity, connected to energize the bridge, and a galvanometer 50 for indicating bridge unbalance. The bridge may be balanced at zero air speed, by adjusting the value of resistor 47, for example. Changes in ambient temperature affect both thermistors equally, and therefore do not unbalance the bridge. However, flow of air through tube 39 creates a temperature difference between thermistors 44 and 45, which produces changes by different amounts in their respective resistance values, and unbalances the bridge. The amount of this unbalance is indicated by a galvanometer 50 which may be calibrated to give an indication directly in terms of true air speed.

If this instrument is to be used as an air speed indicator only, a calibrating valve similar to valve 18 may, of course, be included but no valve is ordinarily needed to adjust the amount of air entering tube 39, since the greatest sensitivity is obtained with maximum air flow, so that the temperature at thermistor 44 is lower than true air temperature—as indicated by curve 22, Fig. 6, for example. However, it is generally preferable not to design the instrument to produce a great deal of cooling at thermistor 44, because such cooling being lower than true air temperature may cause condensation of moisture from the air, which would be undesirable.

Since the air speed indicator is not affected by changes in ambient temperature, the air may be heated before it is admitted into the instrument proper, when the instrument must be operated under severe conditions of moisture or icing. For an example of how this may be accomplished, refer now to Fig. 11. This figure shows an air speed indicator which is substantially the same as that shown in Figs. 9 and 10, except that air scoop 42a has been made substantially longer, and an electrical heating coil 51 has been placed around the air scoop. Battery 52, or other electricity source, and switch 53 are provided to energize heating coil 51 when desired. Bracket 54 is provided to support the lengthened air scoop. When switch 53 is closed, coil 51 heats air which passes through the air scoop before it enters tube 39. This lowers the relative humidity of the air, and prevents the condensation of moisture or the formation of ice within the instrument.

While the temperature indicator and the air speed indicator have been described separately, it will be appreciated that a single instrument embodying principles of this invention may be designed to perform both functions. It will also be appreciated that the invention is not limited to the measurement of air speed and temperature, but that it may also be useful in other applications where the true temperature or speed, or both, of a moving compressible fluid must be measured.

Having described the principles of this invention in the best mode in which I have contemplated applying those principles, I wish it to be understood that the examples described are illustrative only, and that other means can be employed without departing from the true scope of the invention.

What I claim as new and desire to secure by Letters Patent of the United States is:

An instrument for measuring the true temperature of air which is in motion relative to the outer surface of the instrument, comprising a cylindrical tube closed at one of its ends and open at the other, flow-directing means defining a passageway extending tangentially into the closed end of said tube to admit the moving air into the tube for vortical flow therethrough, the open end of said tube facing a direction substantially opposite to that faced by the fluid receiving end of said flow directing means so that air is sucked out of the open end of said tube, a calibrating valve for adjusting the amount of air admitted into said tube, a thermometric device, and means for supporting said device substantially along the axis of said tube to measure the temperature of air in the central portion of its vortical flow, said device having a temperature indicator extending to and readable from a position external said tube.

References Cited in the file of this patent

UNITED STATES PATENTS

| | | |
|---|---|---|
| 492,710 | Carpenter | Feb. 28, 1893 |
| 550,814 | Barrus | Dec. 3, 1895 |
| 1,952,281 | Ranque | Mar. 27, 1934 |
| 2,463,566 | Saldin | Mar. 8, 1949 |

FOREIGN PATENTS

| | | |
|---|---|---|
| 888,695 | France | Sept. 13, 1943 |

OTHER REFERENCES

The Impact Tube by Sanford A. Moss, pub. in A.S.M.E. Transactions, vol. 38, 1916, pp. 761–797.

National Advisory Committee for Aeronautics, Technical Memorandum No. 953, entitled Pressure and Temperature Measurement in Supercharger Investigation, by A. Franz, September 1940, German pub. of 1938.

Thermistors, Their Characteristics and Uses, G. L. Pearson, Bell Laboratories Record, pp. 106–111, December 1940.